US012795128B2

(12) United States Patent
Wang et al.

(10) Patent No.: US 12,795,128 B2
(45) Date of Patent: Nov. 10, 2026

(54) NUMBER RESTRICTION FOR SUBLAYERS

(71) Applicants: Beijing Bytedance Network Technology Co., Ltd., Beijing (CN); Bytedance Inc., Los Angeles, CA (US)

(72) Inventors: Ye-kui Wang, San Diego, CA (US); Zhipin Deng, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/525,231

(22) Filed: Nov. 30, 2023

(65) Prior Publication Data

US 2024/0107039 A1 Mar. 28, 2024

Related U.S. Application Data

(63) Continuation of application No. 17/990,247, filed on Nov. 18, 2022, which is a continuation of application No. PCT/CN2021/095124, filed on May 21, 2021.

(30) Foreign Application Priority Data

May 22, 2020 (WO) ................ PCT/CN2020/091758

(51) Int. Cl.
*H04N 19/196* (2014.01)
*H04N 19/117* (2014.01)
(Continued)

(52) U.S. Cl.
CPC ......... *H04N 19/196* (2014.11); *H04N 19/117* (2014.11); *H04N 19/167* (2014.11); (Continued)

(58) Field of Classification Search
CPC ............... H04N 19/196; H04N 19/117; H04N 19/167; H04N 19/172; H04N 19/70; (Continued)

(56) References Cited

U.S. PATENT DOCUMENTS 11,425,422 B2 8/2022 He et al.
11,601,655 B2 3/2023 Chen et al.
(Continued)

FOREIGN PATENT DOCUMENTS

CN 105519119 A 4/2016
CN 115552903 A 12/2022
(Continued)

OTHER PUBLICATIONS

Singapore Notice of Allowance from Singapore Patent Application No. 11202260419T dated Apr. 1, 2025, 6 pages.
(Continued)

*Primary Examiner* — Joseph W Becker
(74) *Attorney, Agent, or Firm* — Conley Rose, P.C

(57) ABSTRACT

Methods, apparatus, systems for performing video processing such as video encoding, video decoding or video transcoding are described. One example method of video processing includes performing a conversion between a video comprising one or more video layers and a bitstream of the video according to a rule. The rule specifies that responsive to a value of a first field in a sequence parameter set (SPS) that is referred to by a video layer, a second field in a video parameter set referred to by the SPS that is indicative of a maximum number of sublayers allowed in the bitstream is construed to be equal to a third field in the SPS. The third field is indicative of a maximum number of sublayers allowed in the video layer.

19 Claims, 16 Drawing Sheets

(51) Int. Cl.
*H04N 19/167* (2014.01)
*H04N 19/172* (2014.01)
*H04N 19/70* (2014.01)
*H04N 19/82* (2014.01)

(52) U.S. Cl.
CPC ........... *H04N 19/172* (2014.11); *H04N 19/70* (2014.11); *H04N 19/82* (2014.11)

(58) Field of Classification Search
CPC ...... H04N 19/82; H04N 19/30; H04N 19/184; H04N 19/60
See application file for complete search history.

(56) References Cited

U.S. PATENT DOCUMENTS

| | | | | |
|---|---|---|---|---|
| 11,611,778 | B2 * | 3/2023 | Samuelsson | H04N 19/1883 |
| 2016/0366428 | A1 | 12/2016 | Deshpande | |

FOREIGN PATENT DOCUMENTS

| | | | |
|---|---|---|---|
| JP | 7513756 | B2 | 7/2024 |
| WO | 20140168976 | A1 | 10/2014 |
| WO | 2015102042 | A1 | 7/2015 |
| WO | 2015138979 | A2 | 9/2015 |
| WO | 2021195514 | A1 | 9/2021 |
| WO | 2021235412 | A1 | 11/2021 |

OTHER PUBLICATIONS

Document: JVET-R2001-v1, Bross, B., et al., "Versatile Video Coding (Draft 9)," Joint Video Experts Team (JVET) of ITU-T SG 16 WP 3 and ISO/IEC JTC 1/SC 29NVG 11 18th Meeting: by teleconference, Apr. 15-24, 2020, 519 pages.
Document: JVET-R2001-v8, Bross, B., et al., "Versatile Video Coding (Draft 9)," Joint Video Experts Team (JVET) of ITU-T SG 16 WP 3 and ISO/IEC JTC 1/SC 29NVG 11 18th Meeting: by teleconference, Apr. 15-24, 2020, 523 pages.
Brazilian Notice of Allowance from Brazilian Patent Application No. BR112022023360-4 dated Dec. 2, 2025, 10 pages.
Chinese Office Action from Chine4se Patent Application No. 2021800374544 dated Dec. 11, 2025, 15 pages.
Document: JVET-R2001-vA, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 524 pages.
"Series H: Audiovisual and Multimedia Systems Infrastructure of audiovisual services—Coding of moving video High efficiency video coding," ITU-T and ISO/IEC, Rec. ITU-T H.265 | ISO/IEC 23008-2 (in force edition), Feb. 2018, 692 pages.
Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.
VTM software, Retrieved from the internet: https://vcgit.hhi.fraunhofer.de/jvet/VVCSoftware_VTM.git, Feb. 17, 2023, 5 pages.
Document: JCTVC-AC1005-v2, Boyce, J., et al., "HEVC Additional Supplemental Enhancement Information (Draft 4)," Joint Collaborative Team on Video Coding (JCT-VC) of ITU-T SG 16 WP 3 and ISO/IEC JTC 1/SC 29/WG 11 29th Meeting: Macao, CN, Oct. 19-25, 2017, 56 pages.
Document: JVET-R0278, Seregin, V., et al., "AHG8: On SPS sharing and slice type constraint," Joint Video Experts Team (JVET) of ITU-T SG 16 WP 3 and ISO/IEC JTC 1/SC 29/WG 11 18th Meeting: by teleconference, Apr. 15-24, 2020, pages.
Document: JVET-Q0402-v2, Skupin, R., et al., "AHG12: On subpicture and scalability," Joint Video Experts Team (JVET) of ITU-T SG 16 WP 3 and ISO/IEC JTC 1/SC 29/WG 11 17th Meeting: Brussels, BE, Jan. 7-17, 2020, 7 pages.
Document: JVET-S0049-v1, Wang, Y., et al., "AHG9/AHG8/AHG12: On parameter sets and picture header," Joint Video Experts Team (JVET) of ITU-T SG 16 WP 3 and ISO/IEC JTC 1/SC 29/WG 11 19th Meeting: by teleconference, Jun. 22-Jul. 1, 2020, 6 pages.
Document: JVET-S0200, Jhu, H., et al., "AHG9: On ph_inter_slice_allowed_flag in GDR picture," Joint Video Experts Team (JVET) of ITU-T SG 16 WP 3 and ISO/IEC JTC 1/SC 29/WG 11 19th Meeting: by teleconference, Jun. 22-Jul. 1, 2020, 2 pages.
Document: JVET-R0125, Choi, B., et al., "AHG8/AHG9: On signaling max number of sublayers," Joint Video Experts Team (JVET) of ITU-T SG 16 WP 3 and ISO/IEC JTC 1/SC 29/WG 11 18th Meeting: by teleconference, Apr. 15-24, 2020, 2 pages.
Document: JVET-R0199-v1, Kim, D., et al., "AHG9: On vps_max_sublayers_minus1," Joint Video Experts Team (JVET) of ITU-T SG 16 WP 3 and ISO/IEC JTC 1/SC 29/WG 11 18th Meeting: by teleconference, Apr. 15-24, 2020, 3 pages.
Document: JVET-R0158-v1, Wang, B., et al., "Semantic bug fixes for syntax elements in VPS and SPS," Joint Video Experts Team (JVET) of ITU-T SG 16 WP 3 and ISO/IEC JTC 1/SC 29/WG 11 18th Meeting: by teleconference, Apr. 15-24, 2020, 3 pages.
Document: JVET-R0222, Luo, J., et al., "AHG9: SPS sublayer syntax cleanup," Joint Video Experts Team (JVET) of ITU-T SG 16 WP 3 and ISO/IEC JTC 1/SC 29/WG 11 18th Meeting: by teleconference, Apr. 15-24, 2020, 3 pages.
Foreign Communication From A Related Counterpart Application, International Application No. PCT-CN2021-095115, International Search Report dated Aug. 20, 2021, 11 pages.
Foreign Communication From A Related Counterpart Application, International Application No. PCT-CN2021-095124, International Search Report dated Aug. 20, 2021, 10 pages.
Document: JVET-R0339-vB, Sullivan, G., et al., "Agenda and report of the Ccategory 1 AHG pre-meeting for the 18th JVET meeting," Joint Video Experts Team (JVET) of ITU-T SG 16 WP 3 and ISO/IEC JTC 1/SC 29/WG 11 18th Meeting: by teleconference, Apr. 15-24, 2020, 59 pages.
Extended European Search Report from European Application No. 21807970.5 dated Nov. 29, 2023, 11 pages.
Non-Final Office Action from U.S. Appl. No. 17/990,247 dated Nov. 22, 2023, 15 pages.
Non-Final Office Action from U.S. Appl. No. 17/990,247 dated Mar. 16, 2023, 27 pages.
Chinese Office Action from Chinese Patent Application No. 202180037454.4 dated Apr. 22, 2026, 14 pages.

* cited by examiner

NUMBER RESTRICTION FOR SUBLAYERS

CROSS REFERENCE TO RELATED APPLICATIONS

This application is a continuation of U.S. application Ser. No. 17/990,247, filed on Nov. 18, 2022, which is a continuation of International Patent Application No. PCT/CN2021/095124, filed on May 21, 2021, which claims the priority to and benefits of International Patent Application No. PCT/CN2020/091758, filed on May 22, 2020. All the aforementioned patent applications are hereby incorporated by reference in their entireties.

TECHNICAL FIELD

The present disclosure relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present disclosure discloses techniques that can be used by video encoders and decoders to video encoding or decoding.

In one example aspect, a video processing method is disclosed. The method includes performing a conversion between a video comprising one or more video layers comprising one or more video pictures and a bitstream of the video, wherein the bitstream conforms to a format rule that specifies a relationship between a syntax element indicating an identifier of a video parameter set referenced by a video layer and a field of the bitstream.

In another example aspect, another video processing method is disclosed. The method includes performing a conversion between a video comprising one or more video layers comprising one or more video pictures and a bitstream of the video according to a rule, wherein the rule specifies that pictures within a video layer are permitted to reference picture parameter sets that have different values of syntax elements indicative of whether picture partitioning is enabled for a corresponding picture.

In another example aspect, another video processing method is disclosed. The method includes performing a conversion between a video comprising one or more video pictures comprising one or more tiles and a bitstream of the video according to a rule, wherein the rule specifies that a responsive to a syntax element indicative of whether loop filtering across tiles of a picture is enabled being absent from a picture parameter set referred to by the picture, the syntax element is inferred to have a particular value.

In another example aspect, another video processing method is disclosed. The method includes performing a conversion between a video comprising one or more video layers comprising one or more video pictures comprising one or more tiles and/or one or more slices and a bitstream of the video, wherein the bitstream conforms to a format rule that specifies values of one or more flags in a picture parameter set responsive to i) a first condition that is associated with a first syntax element indicative of use of a rectangular slice mode for each picture referring to a picture parameter set has a first value and a second syntax element indicative of a number of rectangular slices in each picture referring to the picture parameter set or ii) a second condition associated with a third syntax element indicative of only a single slice in each picture being satisfied.

In another example aspect, another video processing method is disclosed. The method includes performing a conversion between a video comprising one or more video layers comprising one or more video pictures and a bitstream of the video, wherein the bitstream conforms to a format rule that specifies that a first syntax element indicative of use of an inter-layer prediction in a video layer with a general layer index controls a value of a second syntax element indicating an applicability of an inter-coded subpartition in a picture.

In another example aspect, another video processing method is disclosed. The method includes performing a conversion between a video comprising one or more video layers and a bitstream of the video according to a rule, wherein the rule specifies that responsive to a value of a first field in a sequence parameter set (SPS) that is referred to by a video layer, a second field in a video parameter set referred to by the SPS that is indicative of a maximum number of sublayers allowed in the bitstream is construed to be equal to a third field in the SPS, wherein the third field is indicative of a maximum number of sublayers allowed in the video layer.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present disclosure.

DETAILED DESCRIPTION

Figure 1:
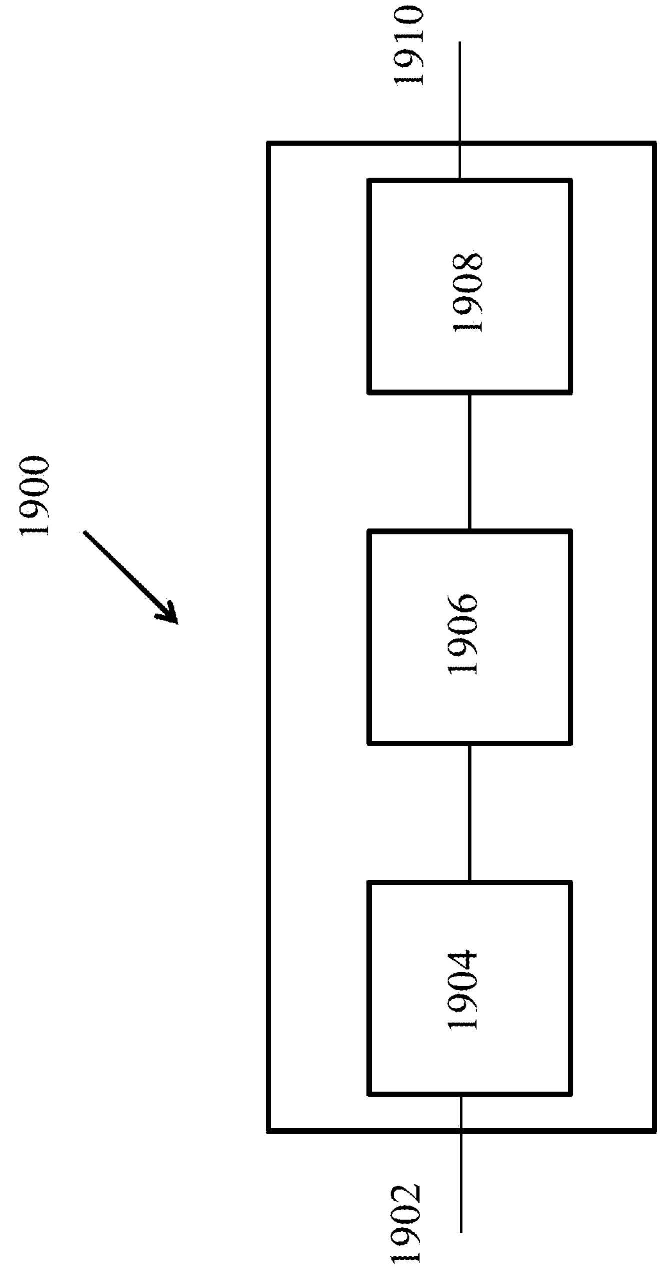
FIG. 1 is a block diagram that illustrates a video coding system in accordance with some embodiments of the present disclosure.

Section headings are used in the present disclosure for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. Introduction

This disclosure is related to video processing technologies. Specifically, it is about some improvements on the designs of video parameter sets (VPSs), picture parameter sets (PPSs), and the picture header (PH). The ideas may be applied individually or in various combination, to any video coding standard or non-standard video codec that supports multi-layer video coding, e.g., the being-developed Versatile Video Coding (VVC).

2. Abbreviations

APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
DCI Decoding Capability Information
DPB Decoded Picture Buffer
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
ILP Inter-Layer Prediction
ILRP Inter-Layer Reference Picture
IRAP Intra Random Access Point
JEM Joint Exploration Model
LTRP Long-Term Reference Picture
MCTS Motion-Constrained Tile Sets
NAL Network Abstraction Layer
OLS Output Layer Set
PH Picture Header
PPS Picture Parameter Set
PTL Profile, Tier and Level
PU Picture Unit
RAP Random Access Point
RBSP Raw Byte Sequence Payload
SEI Supplemental Enhancement Information
SPS Sequence Parameter Set
STRP Short-Term Reference Picture
SVC Scalable Video Coding
VCL Video Coding Layer
VPS Video Parameter Set
VTM VVC Test Model
VUI Video Usability Information
VVC Versatile Video Coding

3. Initial Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1. Picture Partitioning Schemes in HEVC

HEVC includes four different picture partitioning schemes, namely regular slices, dependent slices, tiles, and Wavefront Parallel Processing (WPP), which may be applied for Maximum Transfer Unit (MTU) size matching, parallel processing, and reduced end-to-end delay.

Regular slices are similar as in H.264/AVC. Each regular slice is encapsulated in its own NAL unit, and in-picture prediction (intra sample prediction, motion information prediction, coding mode prediction) and entropy coding dependency across slice boundaries are disabled. Thus a regular slice can be reconstructed independently from other regular slices within the same picture (though there may still have interdependencies due to loop filtering operations).

The regular slice is the only tool that can be used for parallelization that is also available, in virtually identical form, in H.264/AVC. Regular slices based parallelization does not require much inter-processor or inter-core communication (except for inter-processor or inter-core data sharing for motion compensation when decoding a predictively coded picture, which is typically much heavier than inter-processor or inter-core data sharing due to in-picture prediction). However, for the same reason, the use of regular slices can incur substantial coding overhead due to the bit cost of the slice header and due to the lack of prediction across the slice boundaries. Further, regular slices (in contrast to the other tools mentioned below) also serve as the key mechanism for bitstream partitioning to match MTU size requirements, due to the in-picture independence of regular slices and that each regular slice is encapsulated in its own NAL unit. In many cases, the goal of parallelization and the goal of MTU size matching place contradicting demands to the slice layout in a picture. The realization of this situation led to the development of the parallelization tools mentioned below.

Dependent slices have short slice headers and allow partitioning of the bitstream at treeblock boundaries without breaking any in-picture prediction. Basically, dependent slices provide fragmentation of regular slices into multiple NAL units, to provide reduced end-to-end delay by allowing a part of a regular slice to be sent out before the encoding of the entire regular slice is finished.

In WPP, the picture is partitioned into single rows of coding tree blocks (CTBs). Entropy decoding and prediction are allowed to use data from CTBs in other partitions. Parallel processing is possible through parallel decoding of CTB rows, where the start of the decoding of a CTB row is delayed by two CTBs, so to ensure that data related to a CTB above and to the right of the subject CTB is available before the subject CTB is being decoded. Using this staggered start (which appears like a wavefront when represented graphically), parallelization is possible with up to as many processors/cores as the picture contains CTB rows. Because in-picture prediction between neighboring treeblock rows within a picture is permitted, the required inter-processor/inter-core communication to enable in-picture prediction can be substantial. The WPP partitioning does not result in the production of additional NAL units compared to when it is not applied, thus WPP is not a tool for MTU size matching. However, if MTU size matching is required, regular slices can be used with WPP, with certain coding overhead.

Tiles define horizontal and vertical boundaries that partition a picture into tile columns and rows. Tile column runs from the top of a picture to the bottom of the picture. Likewise, tile row runs from the left of the picture to the right of the picture. The number of tiles in a picture can be derived simply as number of tile columns multiply by number of tile rows.

The scan order of CTBs is changed to be local within a tile (in the order of a CTB raster scan of a tile), before decoding the top-left CTB of the next tile in the order of tile raster scan of a picture. Similar to regular slices, tiles break in-picture prediction dependencies as well as entropy decoding dependencies. However, they do not need to be included into individual NAL units (same as WPP in this regard); hence tiles cannot be used for MTU size matching. Each tile can be processed by one processor/core, and the inter-processor/inter-core communication required for in-picture prediction between processing units decoding neighboring tiles is limited to conveying the shared slice header in cases a slice is spanning more than one tile, and loop filtering related sharing of reconstructed samples and metadata. When more than one tile or WPP segment is included in a slice, the entry point byte offset for each tile or WPP segment other than the first one in the slice is signaled in the slice header.

For simplicity, restrictions on the application of the four different picture partitioning schemes have been specified in HEVC. A given coded video sequence cannot include both tiles and wavefronts for most of the profiles specified in HEVC. For each slice and tile, either or both of the following conditions must be fulfilled: 1) all coded treeblocks in a slice belong to the same tile; 2) all coded treeblocks in a tile belong to the same slice. Finally, a wavefront segment contains exactly one CTB row, and when WPP is in use, if a slice starts within a CTB row, it must end in the same CTB row.

A recent amendment to HEVC is specified in the JCT-VC output document JCTVC-AC1005, J. Boyce, A. Ramasubramonian, R. Skupin, G. J. Sullivan, A. Tourapis, Y.-K. Wang (editors), "HEVC Additional Supplemental Enhancement Information (Draft 4)," Oct. 24, 2017, publicly available herein: http://phenix.int-evry.fr/jct/doc_end_user/documents/29_Macau/wg11/JCTVC-AC1005-v2.zip. With this amendment included, HEVC specifies three MCTS-related SEI messages, namely temporal MCTSs SEI message, MCTSs extraction information set SEI message, and MCTSs extraction information nesting SEI message.

The temporal MCTSs SEI message indicates existence of MCTSs in the bitstream and signals the MCTSs. For each MCTS, motion vectors are restricted to point to full-sample locations inside the MCTS and to fractional-sample locations that require only full-sample locations inside the MCTS for interpolation, and the usage of motion vector candidates for temporal motion vector prediction derived from blocks outside the MCTS is disallowed. This way, each MCTS may be independently decoded without the existence of tiles not included in the MCTS.

The MCTSs extraction information sets SEI message provides supplemental information that can be used in the MCTS sub-bitstream extraction (specified as part of the semantics of the SEI message) to generate a conforming bitstream for an MCTS set. The information consists of a number of extraction information sets, each defining a number of MCTS sets and containing RBSP bytes of the replacement VPSs, SPSs, and PPSs to be used during the MCTS sub-bitstream extraction process. When extracting a sub-bitstream according to the MCTS sub-bitstream extraction process, parameter sets (VPSs, SPSs, and PPSs) need to be rewritten or replaced, slice headers need to be slightly updated because one or all of the slice address related syntax elements (including first_slice_segment_in_pic_flag and slice_segment_address) typically would need to have different values.

3.2. Partitioning of Pictures in VVC

In VVC, a picture is divided into one or more tile rows and one or more tile columns. A tile is a sequence of CTUs that covers a rectangular region of a picture. The CTUs in a tile are scanned in raster scan order within that tile.

A slice consists of an integer number of complete tiles or an integer number of consecutive complete CTU rows within a tile of a picture.

Two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture contains one or more slices that collectively cover a rectangular region of a picture.

Figure 7:
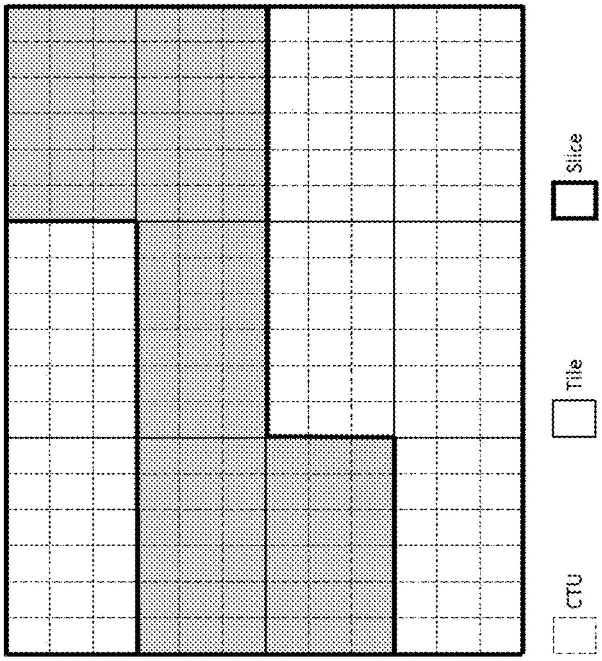
FIG. 7 shows a picture with 18 by 12 luma coding tree units (CTUs) that is partitioned into 12 tiles and 3 raster-scan slices.

FIG. 7 shows an example of raster-scan slice partitioning of a picture, where the picture is divided into 12 tiles and 3 raster-scan slices.

Figure 8:
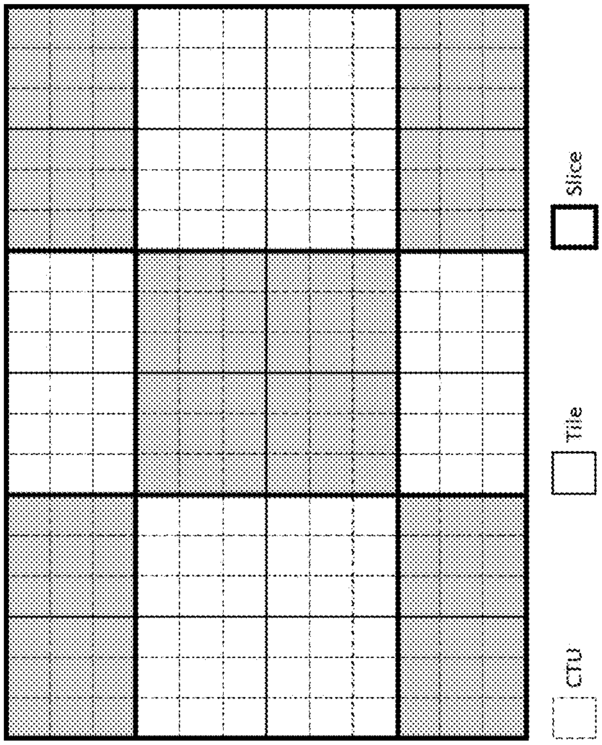
FIG. 8 shows a picture with 18 by 12 luma CTUs that is partitioned into 24 tiles and 9 rectangular slices.

FIG. 8 shows an example of rectangular slice partitioning of a picture, where the picture is divided into 24 tiles (6 tile columns and 4 tile rows) and 9 rectangular slices.

Figure 9:
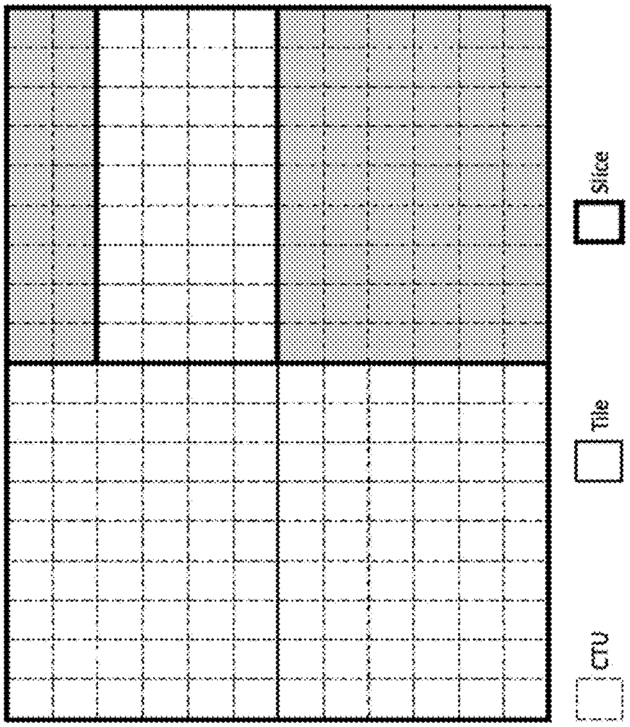
FIG. 9 shows a picture that is partitioned into 4 tiles and 4 rectangular slices.
Figure 11:
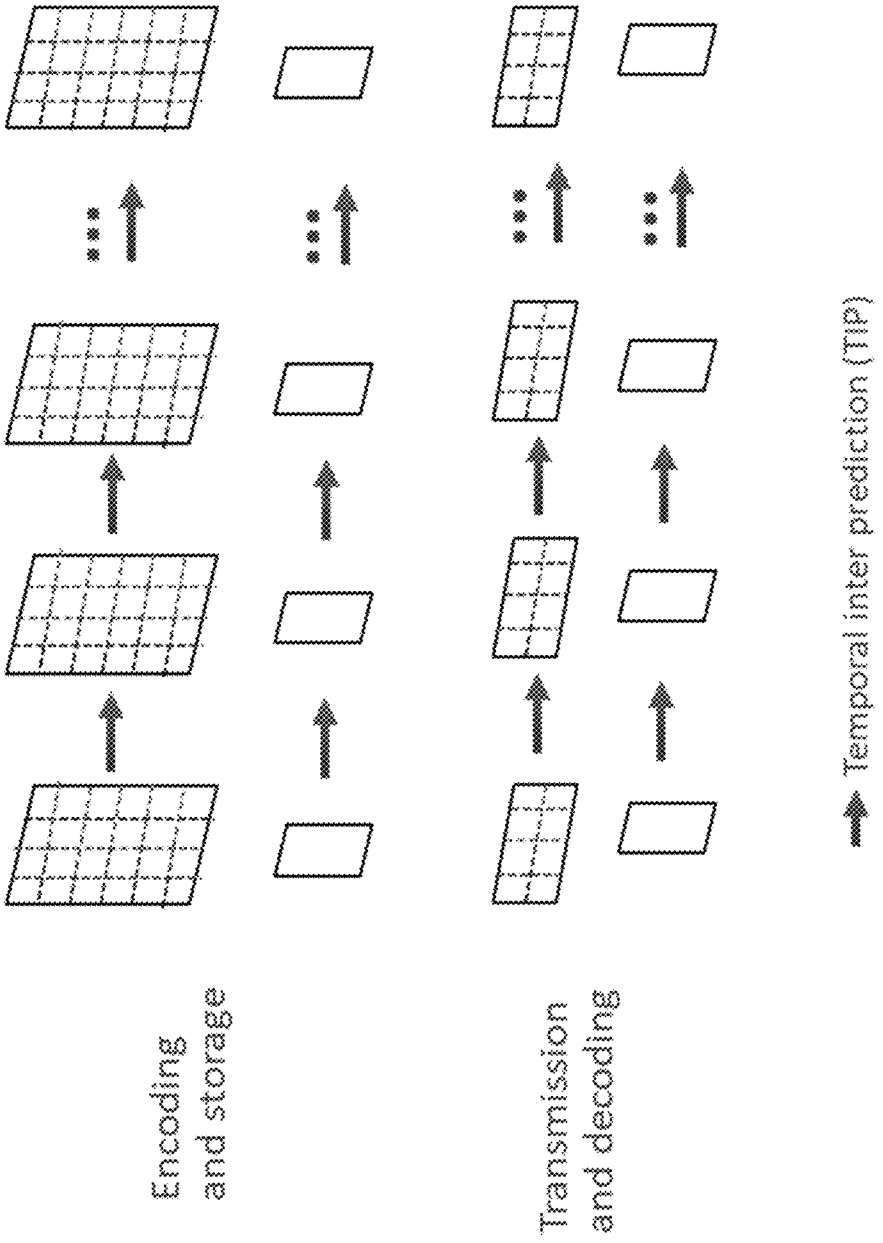
FIG. 11 shows a typical subpicture-based viewport-dependent 360° video coding scheme.
Figure 12:
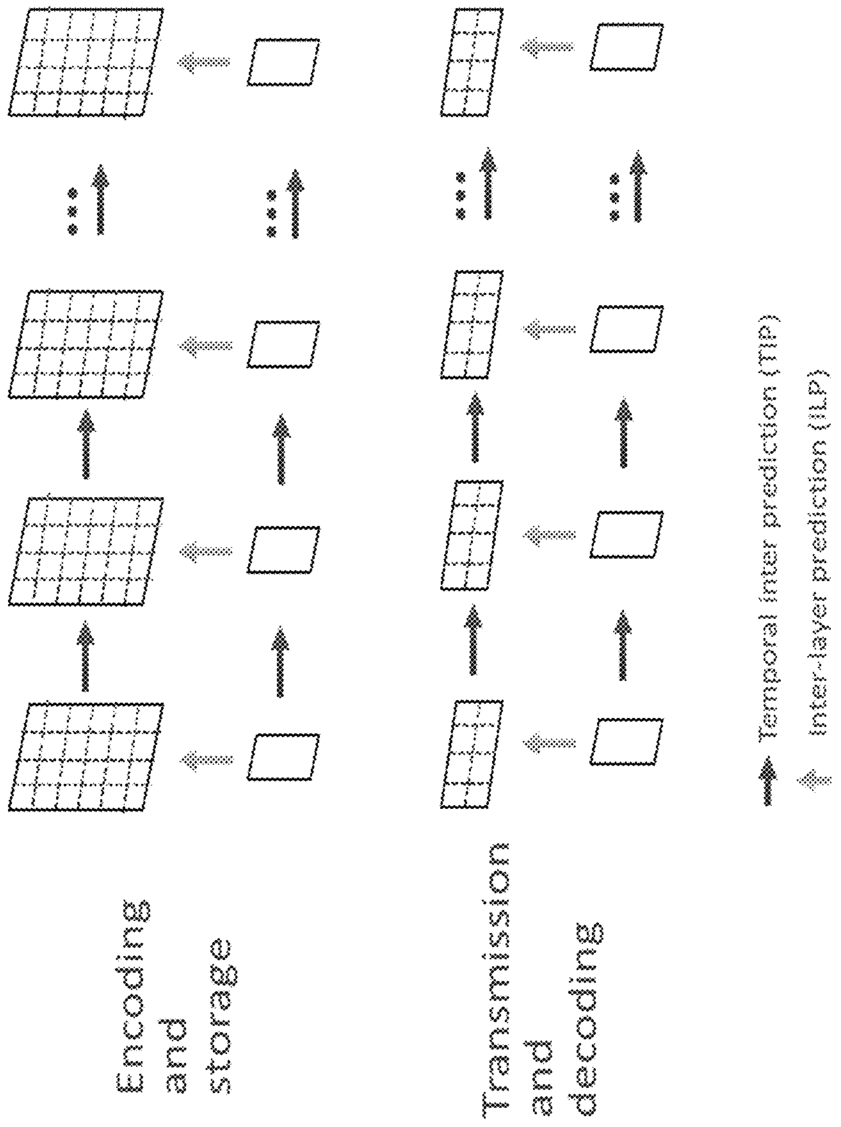
FIG. 12 shows an improved viewport-dependent 360° video coding scheme based on subpictures and spatial scalability.

FIG. 9 shows an example of a picture partitioned into tiles and rectangular slices, where the picture is divided into 4 tiles (2 tile columns and 2 tile rows) and 4 rectangular slices.

Figure 10:
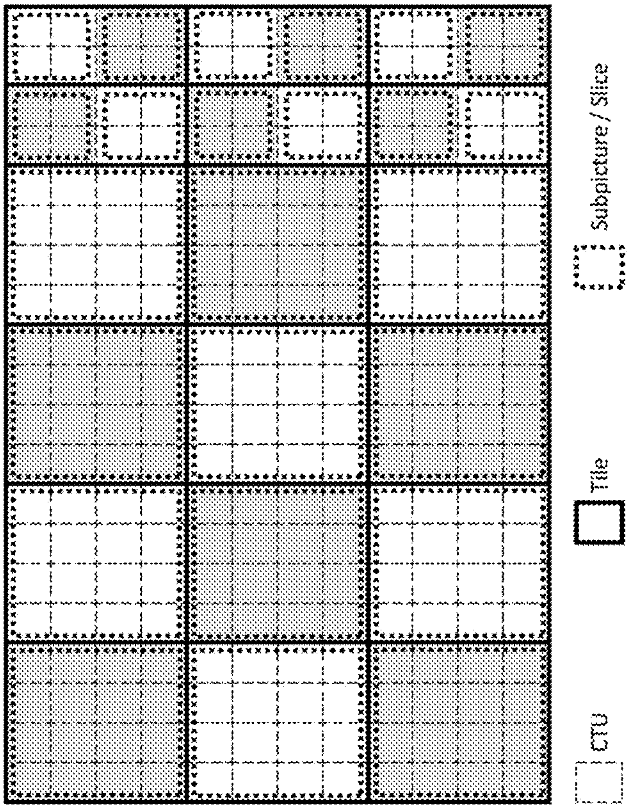
FIG. 10 shows picture that is partitioned into 15 tiles, 24 slices and 24 subpictures.

FIG. 10 shows an example of subpicture partitioning of a picture, where a picture is partitioned into 18 tiles, 12 on the left-hand side each covering one slice of 4 by 4 CTUs and 6 tiles on the right-hand side each covering 2 vertically-stacked slices of 2 by 2 CTUs, altogether resulting in 24 slices and 24 subpictures of varying dimensions (each slice is a subpicture).

3.3. Picture Resolution Change Within a Sequence

In AVC and HEVC, the spatial resolution of pictures cannot change unless a new sequence using a new SPS starts, with an IRAP picture. VVC enables picture resolution change within a sequence at a position without encoding an IRAP picture, which is always intra-coded. This feature is sometimes referred to as reference picture resampling (RPR), as the feature needs resampling of a reference picture used for inter prediction when that reference picture has a different resolution than the current picture being decoded.

The scaling ratio is restricted to be larger than or equal to 1/2 (2 times downsampling from the reference picture to the current picture), and less than or equal to 8 (8 times upsampling). Three sets of resampling filters with different frequency cutoffs are specified to handle various scaling ratios between a reference picture and the current picture. The three sets of resampling filters are applied respectively for the scaling ratio ranging from 1/2 to 1/1.75, from 1/1.75 to 1/1.25, and from 1/1.25 to 8. Each set of resampling filters has 16 phases for luma and 32 phases for chroma which is same to the case of motion compensation interpolation filters. Actually the normal motion compensation (MC) interpolation process is a special case of the resampling process with scaling ratio ranging from 1/1.25 to 8. The horizontal and vertical scaling ratios are derived based on picture width and height, and the left, right, top and bottom scaling offsets specified for the reference picture and the current picture.

Other aspects of the VVC design for support of this feature that are different from HEVC include: i) The picture resolution and the corresponding conformance window are signaled in the PPS instead of in the SPS, while in the SPS the maximum picture resolution is signaled. ii) For a single-layer bitstream, each picture store (a slot in the DPB for storage of one decoded picture) occupies the buffer size as required for storing a decoded picture having the maximum picture resolution.

3.4. Scalable Video Coding (SVC) in General and in VVC

Scalable video coding (SVC, sometimes also just referred to as scalability in video coding) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the Multiview or three dimensional (3D) extension of the HEVC standard, there may be multiple views, and information of one view may be utilized to code (e.g., encode or decode) the information of another view (e.g., motion estimation, motion vector prediction and/or other redundancies).

In SVC, the parameters used by the encoder or the decoder are grouped into parameter sets based on the coding level (e.g., video-level, sequence-level, picture-level, slice level, etc.) in which they may be utilized. For example, parameters that may be utilized by one or more coded video sequences of different layers in the bitstream may be included in a video parameter set (VPS), and parameters that are utilized by one or more pictures in a coded video sequence may be included in a sequence parameter set (SPS). Similarly, parameters that are utilized by one or more slices in a picture may be included in a picture parameter set (PPS), and other parameters that are specific to a single slice may be included in a slice header. Similarly, the indication of which parameter set(s) a particular layer is using at a given time may be provided at various coding levels.

Thanks to the support of reference picture resampling (RPR) in VVC, support of a bitstream containing multiple layers, e.g., two layers with standard definition (SD) and high definition (HD) resolutions in VVC can be designed without the need any additional signal-processing-level coding tool, as upsampling needed for spatial scalability support can just use the RPR upsampling filter. Nevertheless, high-level syntax changes (compared to not supporting scalability) are needed for scalability support. Scalability support is specified in VVC version 1. Different from the scalability supports in any earlier video coding standards, including in extensions of AVC and HEVC, the design of VVC scalability has been made friendly to single-layer decoder designs as much as possible. The decoding capability for multi-layer bitstreams are specified in a manner as if there were only a single layer in the bitstream. E.g., the decoding capability, such as DPB size, is specified in a manner that is independent of the number of layers in the bitstream to be decoded. Basically, a decoder designed for single-layer bitstreams does not need much change to be able to decode multi-layer bitstreams. Compared to the designs of multi-layer extensions of AVC and HEVC, the high level syntax (HLS) aspects have been significantly simplified at the sacrifice of some flexibilities. For example, an IRAP AU is required to contain a picture for each of the layers present in the CVS.

3.5. Parameter Sets

AVC, HEVC, and VVC specify parameter sets. The types of parameter sets include SPS, PPS, APS, and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signaling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

4. Technical Problems Solved by Disclosed Technical Solutions

The existing designs of VPS, PPS, and PH in the latest VVC text (in JVET-R2001-vA/v10) have the following problems:

1) When sps_video_parameter_set_id is equal to 0, there is only one layer and no VPS is referred. However, the values of the variables TotalNumOlss, NumLayersInOls[0], and of LayerIdInOls[0][0] are used but not defined.
2) When sps_video_parameter_set_id is equal to 0, the value of vps_max_sublayers_minus1 is inferred to be equal to 6. However, it would make more sense to infer it to be equal to sps_max_sublayers_minus1 in that case, which would enable more optimal use of vps_max_sublayers_minus1 when sps_video_parameter_set_id is equal to 0.
3) In the latest VVC text, it is required that the value of pps_no_pic_partition_flag shall be the same for all PPSs that are referred to by coded pictures within a CLVS. When pps_no_pic_partition_flag is equal to 1, each picture referring to the PPS has only one of each of tile, slice, and subpicture. However, the encoder should be allowed to have only one tile or slice for some pictures in a CLVS and multiple tiles or slices in other pictures in the same CLVS. Therefore, it would make more sense to remove this constraint.
4) In the latest VVC text, the value of pps_loop_filter_across_tiles_enabled_flag is inferred to be equal to 1 when not present. This is odd, compared to the inference of sps_loop_filter_across_subpic_enabled_pic_flag[i] and pps_loop_filter_across_slices_enabled_flag. pps_loop_filter_across_tiles_enabled_flag is not present when pps_no_pic_partition_flag is equal to 1 or NumTilesInPic is equal to 1. Under either of these two conditions, there is only one tile per picture, thus tile boundaries are picture boundaries, and there is no loop filtering across picture boundaries. Therefore, it makes more sense to infer the value of pps_loop_filter_across_tiles_enabled_flag is inferred to be equal to 0 when not present.
5) When pps_rect_slice_flag is equal to 1 and pps_num_slices_in_pic_minus1 is equal to 0, there is only one slice in each picture referring to the PPS. In this case, when any of the 6 PPS flags pps_alf_info_in_ph_flag, pps_rpl_info_in_ph_flag, pps_dbf_info_in_ph_flag, pps_sao_info_in_ph_flag, pps_wp_info_in_ph_flag, and pps_qp_delta_info_in_ph_flag is present, it would make sense to require its value to be equal to 0, the following benefits:
   a. To be better aligned with the inference of the value to 0 when pps_no_pic_partition_flag is equal to 1.
   b. For more optimal syntax in the case of pps_rpl_info_in_ph_flag or pps_wp_info_in_ph_flag.
   c. For the case of pps_alf_info_in_ph_flag, to enable the use of ALF for the use case that applies independent parallel encoding of different subpictures that were split before encoding into individual VVC bitstreams each containing one subpicture, and later merging into one VVC bitstream wherein each picture contains multiple subpictures. In that use case, each of such individual bitstreams contains one slice/subpicture per picture, but the PH is not in the SH such that when merging the PH and SHs for each picture do not need to be rewritten.
6) When vps_independent_layer_flag[GeneralLayerIdx[nuh_layer_id]] is equal to 0 for a picture, the layer containing the picture is not an independent layer and has at least one reference layer. For such a picture, naturally inter-layer prediction should be allowed, even when it is an IRAP picture. Therefore, it makes sense to require the value of the PH syntax element ph_inter_slice_allowed_flag to be equal to 1 when vps_independent_layer_flag[GeneralLayerIdx[nuh_layer_id]] is equal to 0.

5. Examples of Technical Solutions and Embodiments

To solve the above problems, and others, methods as summarized below are disclosed. The items should be considered as examples to explain the general concepts and should not be interpreted in a narrow way. Furthermore, these items can be applied individually or combined in any manner.

1) To solve problem 1, when sps_video_parameter_set_id is equal to 0, the values of TotalNumOlss and NumLayersInOls[0] are both set equal to 1, and the value of LayerIdInOls[0][0] is set equal to the nuh_layer_id of the layer in the CVS.
2) To solve problem 2, when sps_video_parameter_set_id is equal to 0, infer the value of vps_max_sublayers_minus1 to be equal to sps_max_sublayers_minus1.
   a. Alternatively, in addition, specify that the value of sps_max_sublayers_minus1 shall be in the range of 0 to 6, inclusive, and shall not be greater than vps_max_sublayers_minus1.
3) To solve problem 3, allow the value of pps_no_pic_partition_flag to be different for different PPSs that are referred to by coded pictures within a CLVS.
4) To solve problem 4, infer the value of pps_loop_filter_across_tiles_enabled_flag to be equal to 0 when not present.
5) To solve problem 5, when pps_rect_slice_flag is equal to 1 and pps_num_slices_in_pic_minus1 is equal to 0, require the 6 PPS flags pps_alf_info_in_ph_flag, pps_rpl_info_in_ph_flag, pps_dbf_info_in_ph_flag, pps_sao_info_in_ph_flag, pps_wp_info_in_ph_flag, and pps_qp_delta_info_in_ph_flag to be all equal to 0.
   a. Alternatively, when pps_rect_slice_flag is equal to 1 and pps_num_slices_in_pic_minus1 is equal to 0, or when one_slice_per_pic_constraint_flag is equal to 1, require the 6 PPS flags pps_alf_info_in_ph_flag, pps_rpl_info_in_ph_flag, pps_dbf_info_in_ph_flag, pps_sao_info_in_ph_flag, pps_wp_info_in_ph_flag, and pps_qp_delta_info_in_ph_flag to be all equal to 0.
   b. Alternatively, when one_slice_per_pic_constraint_flag is equal to 1, require the 6 PPS flags pps_alf_info_in_ph_flag, pps_rpl_info_in_ph_flag, pps_dbf_info_in_ph_flag, pps_sao_info_in_ph_flag, pps_wp_info_in_ph_flag, and pps_qp_delta_info_in_ph_flag to be all equal to 0.

c. Alternatively, when pps_rect_slice_flag is equal to 1 and pps_num_slices_in_pic_minus1 is equal to 0, the 6 PPS flags pps_alf_info_in_ph_flag, pps_rpl_info_in_ph_flag, pps_dbf_info_in_ph_flag, pps_sao_info_in_ph_flag, pps_wp_info_in_ph_flag, and pps_qp_delta_info_in_ph_flag are all skipped and inferred to be equal to 0.

d. Alternatively, when pps_rect_slice_flag is equal to 1 and pps_num_slices_in_pic_minus1 is equal to 0, or when one_slice_per_pic_constraint_flag is equal to 1, the 6 PPS flags pps_alf_info_in_ph_flag, pps_rpl_info_in_ph_flag, pps_dbf_info_in_ph_flag, pps_sao_info_in_ph_flag, pps_wp_info_in_ph_flag, and pps_qp_delta_info_in_ph_flag are all skipped and inferred to be equal to 0.

e. Alternatively, when one_slice_per_pic_constraint_flag is equal to 1, the 6 PPS flags pps_alf_info_in_ph_flag, pps_rpl_info_in_ph_flag, pps_dbf_info_in_ph_flag, pps_sao_info_in_ph_flag, pps_wp_info_in_ph_flag, and pps_qp_delta_info_in_ph_flag are all skipped and inferred to be equal to 0.

6) To solve problem 6, condition ph_inter_slice_allowed_flag on if (vps_independent_layer_flag[GeneralLayerIdx[nuh_layer_id]]) and infer the value to be 1 when not present.

a. Alternatively, constrain that the value of ph_inter_slice_allowed_flag shall be equal to 1 when vps_independent_layer_flag[GeneralLayerIdx[nuh_layer_id]] is equal to 0.

6. Embodiments

Below are some example embodiments for some of the aspects summarized above in Section 5, which can be applied to the VVC specification. The changed texts are based on the latest VVC text in JVET-R2001-vA/v10. Most relevant parts that have been added or modified are highlighted in bold and Italic, and some of the deleted parts are marked with double brackets (e.g., [[a]] denotes the deletion of the character "a"). There may be some other changes that are editorial in nature and thus not highlighted.

6.1. First Embodiment

This embodiment is for items 1, 2, 2a, 3, 4, 5, and 6a.

7.4.3.3 Sequence Parameter Set RBSP Semantics sps_video_parameter_set_id, when greater than 0, specifies the value of vps_video_parameter_set_id for the VPS referred to by the SPS.

When sps_video_parameter_set_id is equal to 0, the following applies:

The SPS does not refer to a VPS, and no VPS is referred to when decoding each CLVS referring to the SPS.

The value of vps_max_layers_minus1 is inferred to be equal to 0.

[[The value of vps_max_sublayers_minus1 is inferred to be equal to 6.]]

The CVS shall contain only one layer (i.e., all VCL NAL unit in the CVS shall have the same value of nuh_layer_id).

The value of GeneralLayerIdx[nuh_layer_id] is [[inferred to be]] set equal to 0.

The value of vps_independent_layer_flag[GeneralLayerIdx[nuh_layer_id]] is inferred to be equal to 1.

*The values of TotalNumOlss and NumLayersInOls[ 0 ] are both set equal to 1, and the value of LayerIdInOls[ 0 ][ 0 ] is set equal to the nuh_layer_id of the layer in the CVS.*

When vps_independent_layer_flag[GeneralLayerIdx[nuh_layer_id]] is equal to 1, the SPS referred to by a CLVS with a particular nuh_layer_id value nuhLayerId shall have nuh_layer_id equal to nuhLayerId.

The value of sps_video_parameter_set_id shall be the same in all SPSs that are referred to by CLVSs in a CVS.

sps_max_sublayers_minus1 plus 1 specifies the maximum number of temporal sublayers that may be present in each CLVS referring to the SPS. The value of sps_max_sublayers_minus1 shall be in the range of 0 to [[vps_max_sublayers_minus1, inclusive]] *6, inclusive, and shall not be greater than vps_max_ sublayers_minus1. When sps_video_parameter_set_id is equal to 0, the value of vps_max_ sublayers_minus1 is inferred to be equal to sps_max_sublayers_minus1.*

7.4.3.4 Picture Parameter Set RBSP Semantics pps_no_pic_partition_flag equal to 1 specifies that no picture partitioning is applied to each picture referring to the PPS. pps_no_pic_partition_flag equal to 0 specifies that each picture referring to the PPS may be partitioned into more than one tile or slice.

[[It is a requirement of bitstream conformance that the value of pps_no_pic_partition_flag shall be the same for all PPSs that are referred to by coded pictures within a CLVS.]]

When sps_num_subpics_minus1 is greater than 0 or pps_mixed_nalu_types_in_pic_flag is equal to 1, the value of pps_no_pic_partition_flag shall be equal to 0.

pps_loop_filter_across_tiles_enabled_flag equal to 1 specifies that in-loop filtering operations across tile boundaries are enabled and may be performed across tile boundaries in pictures referring to the PPS. pps_loop_filter_across_tiles_enabled_flag equal to 0 specifies that in-loop filtering operations across tile boundaries are disabled and not performed across tile boundaries in pictures referring to the PPS. The in-loop filtering operations include the deblocking filter, sample adaptive offset filter, and adaptive loop filter operations. When not present, the value of pps_loop_filter_across_tiles_enabled_flag is inferred to be [[equal to 1]] *equal to 0*.

pps_dbf_info_in_ph_flag equal to 1 specifies that deblocking filter information is present in the PH syntax structure and not present in slice headers referring to the PPS that do not contain a PH syntax structure. pps_dbf_info_in_ph_flag equal to 0 specifies that deblocking filter information is not present in the PH syntax structure and may be present in slice headers referring to the PPS. When not present, the value of pps_dbf_info_in_ph_flag is inferred to be equal to 0.

*When pps_rect_slice_flag is equal to 1 and pps_num_ slices_in_pic_minus1 is equal to 0, the value of pps_dbf_info_in_ph_flag shall be equal to 0.* pps_rpl_info_in_ph_flag equal to 1 specifies that reference picture list information is present in the PH syntax structure and not present in slice headers referring to the PPS that do not contain a PH syntax structure. pps_rpl_info_in_ph_flag equal to 0 specifies that reference picture list information is not present in the PH syntax structure and may be present in slice headers referring to the PPS. When not present, the value of pps_rpl_info_in_ph_flag is inferred to be equal to 0.

*When pps_rect_slice_flag is equal to 1 and pps_num_slices_in_pic _minus1 is equal to 0, the value of pps_rpl_info_in_ph_flag shall be equal to 0.* pps_sao_info_in_ph_flag equal to 1 specifies that SAO filter information is present in the PH syntax structure and not present in slice headers referring to the PPS that do not contain a PH syntax structure. pps_sao_info_in_ph_flag equal to 0 specifies that SAO filter information is not present in the PH syntax structure and may be present in slice headers referring to the PPS. When not present, the value of pps_sao_info_in_ph_flag is inferred to be equal to 0.

*When pps_rect_slice_flag is equal to 1 and pps_num_slices_in_ pic_minus1 is equal to 0, the value of pps_sao_info_in_ph_flag shall be equal to 0.* pps_alf_info_in_ph_flag equal to 1 specifies that ALF information is present in the PH syntax structure and not present in slice headers referring to the PPS that do not contain a PH syntax structure. pps_alf_info_in_ph_flag equal to 0 specifies that ALF information is not present in the PH syntax structure and may be present in slice headers referring to the PPS. When not present, the value of pps_alf_info_in_ph_flag is inferred to be equal to 0.

*When pps_rect_slice_flag is equal to 1 and pps_num_slices_in _pic_minus1 is equal to 0, the value of pps_alf_info_in_ph_flag shall be equal to 0.* pps_wp_info_in_ph_flag equal to 1 specifies that weighted prediction information may be present in the PH syntax structure and not present in slice headers referring to the PPS that do not contain a PH syntax structure. pps_wp_info_in_ph_flag equal to 0 specifies that weighted prediction information is not present in the PH syntax structure and may be present in slice headers referring to the PPS. When not present, the value of pps_wp_info_in_ph_flag is inferred to be equal to 0.

*When pps_rect_slice_flag is equal to 1 and pps_num _slices_in_pic_minus1 is equal to 0, the value of pps_wp_info_in_ph_flag shall be equal to 0.* pps_qp_delta_info_in_ph_flag equal to 1 specifies that QP delta information is present in the PH syntax structure and not present in slice headers referring to the PPS that do not contain a PH syntax structure. pps_qp_delta_info_in_ph_flag equal to 0 specifies that QP delta information is not present in the PH syntax structure and is present in slice headers referring to the PPS. When not present, the value of pps_qp_delta_info_in_ph_flag is inferred to be equal to 0.

*When pps_rect_slice_flag is equal to 1 and pps_num_slices_in _pic_minus1 is equal to 0, the value of pps_qp_delta_info_in_ph_flag shall be equal to 0.*

7.4.3.7 Picture Header Structure Semantics ph_inter_slice_allowed_flag equal to 0 specifies that all coded slices of the picture have sh_slice_type equal to 2. ph_inter_slice_allowed_flag equal to 1 specifies that there may or may not be one or more coded slices in the picture that have sh_slice_type equal to 0 or 1.

When ph_gdr_or_irap_pic_flag is equal to 1 and ph_gdr_pic_flag is equal to 0 (i.e., the picture is an IRAP picture), and vps_independent_layer_flag[GeneralLayerIdx [nuh_layer_id]] is equal to 1, the value of ph_inter_slice_allowed_flag shall be equal to 0.

*When vps_independent_layer_flag[ GeneralLayerIdx[ nuh_layer_id ] ] is equal to 0, the value of ph_inter_slice_allowed_flag shall be equal to 1.* ph_intra_slice_allowed_flag equal to 0 specifies that all coded slices of the picture have sh_slice_type equal to 0 or 1. ph_intra_slice_allowed_flag equal to 1 specifies that there may or may not be one or more coded slices in the picture that have sh_slice_type equal to 2. When not present, the value of ph_intra_slice_allowed_flag is inferred to be equal to 1.

NOTE 2—For bitstreams that are supposed to work subpicture based bitstream merging without the need of changing PH NAL units, the encoder is expected to set the values of both ph_inter_slice_allowed_flag and ph_intra_slice_allowed_flag equal to 1.

FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1900 may include a coding component 1904 that may implement the various coding or encoding methods described in the present disclosure. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 2:
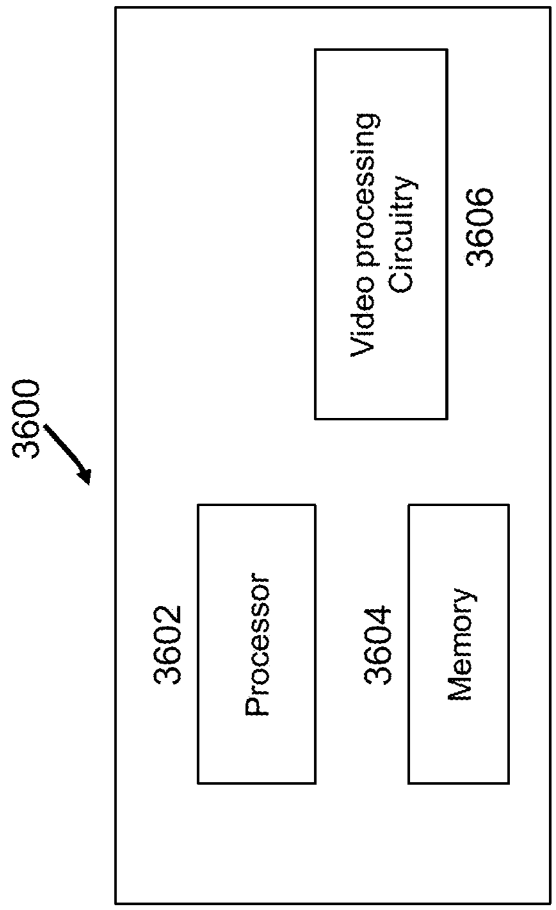
FIG. 2 is a block diagram of an example hardware platform used for video processing.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present disclosure. The memory (memories) 3604 may be used for storing data and code used for implementing the methods and techniques described herein. The video processing hardware 3606 may be used to implement, in hardware circuitry, some techniques described in the present disclosure.

Figure 4:
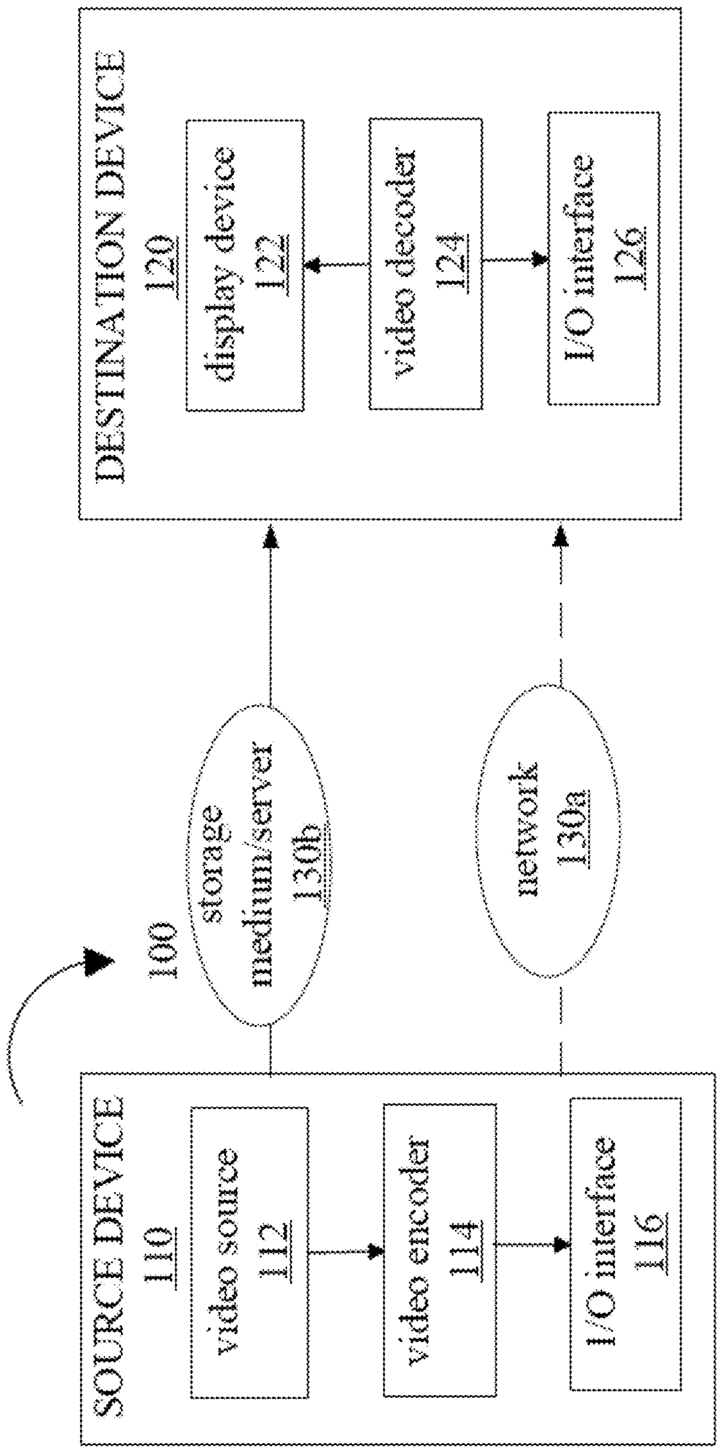
FIG. 4 is a block diagram that illustrates an example video coding system.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130*a*. The encoded video data may also be stored onto a storage medium/server 130*b* for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/ server 130*b*. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 5:
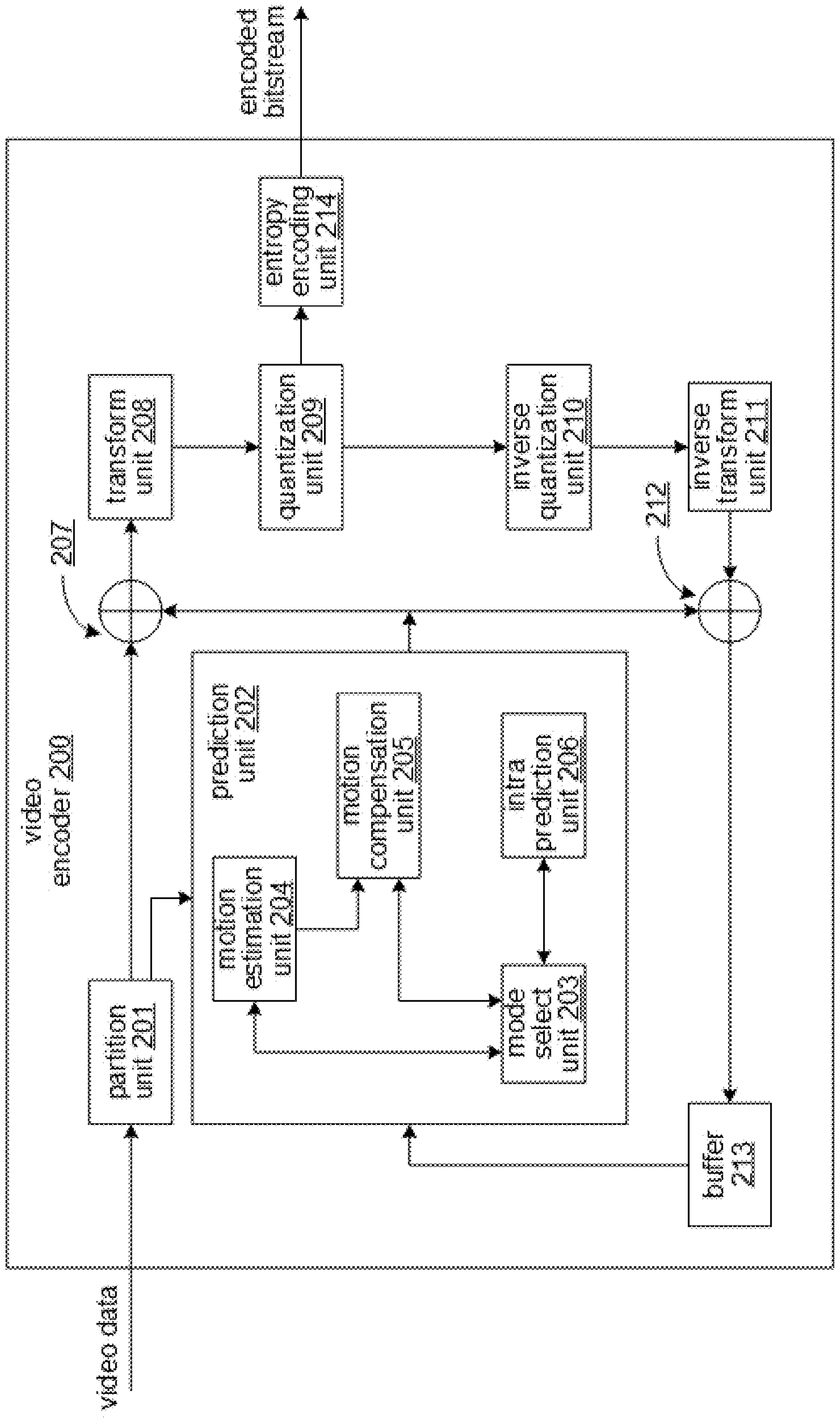
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
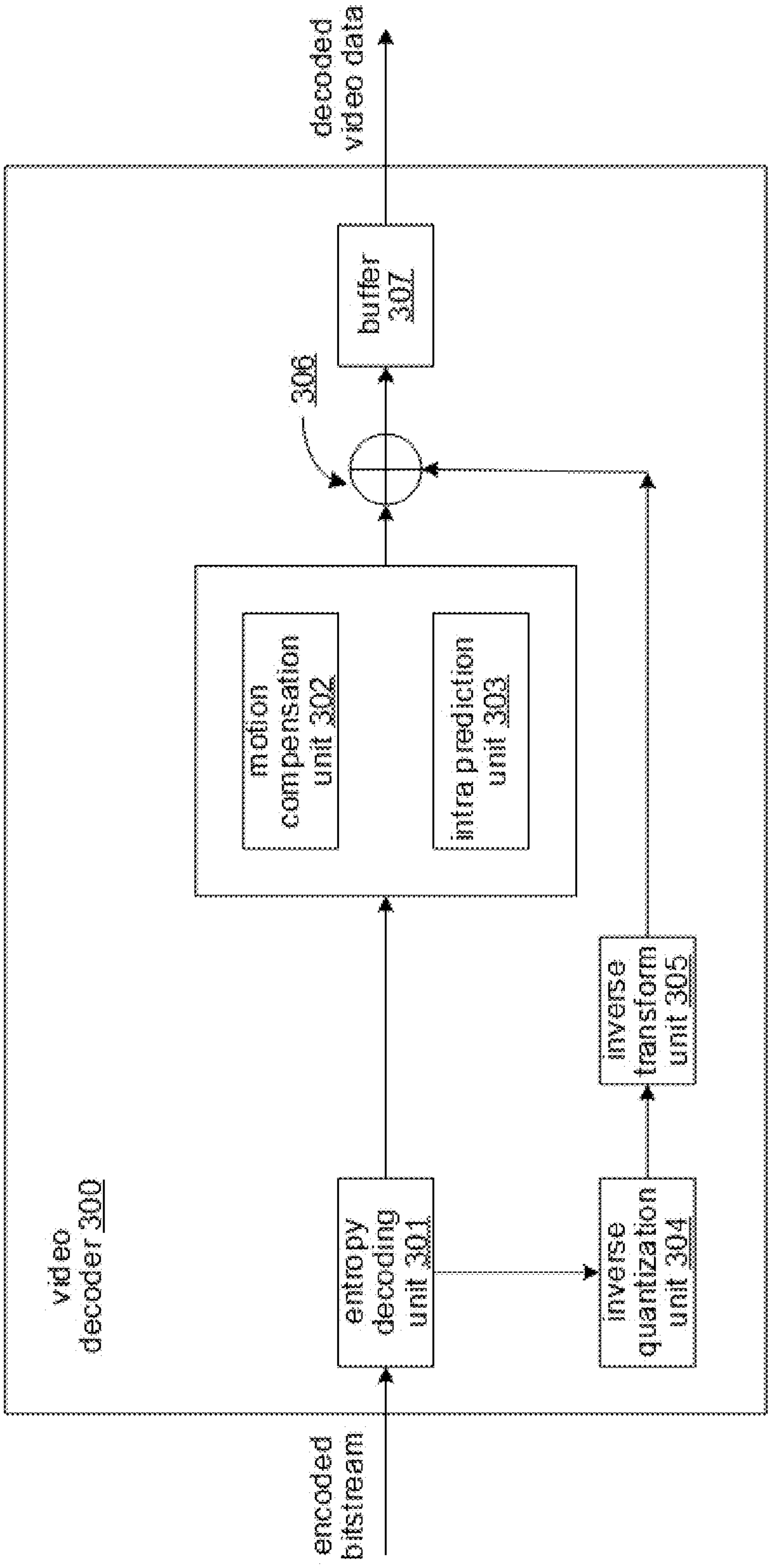
FIG. 6 is a block diagram that illustrates a decoder in accordance with some embodiments of the present disclosure.

FIG. 6 is a block diagram illustrating an example of video decoder 300 which may be video decoder 124 in the system 100 illustrated in FIG. 4.

The video decoder 300 may be configured to perform any or all of the techniques of this disclosure. In the example of FIG. 5, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transformation unit 305 , and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of solutions describes some embodiments of the disclosed technology.

A first set of solutions is provided next. The following solutions show example embodiments of techniques discussed in the previous section (e.g., items 1, 2).

Figure 3:
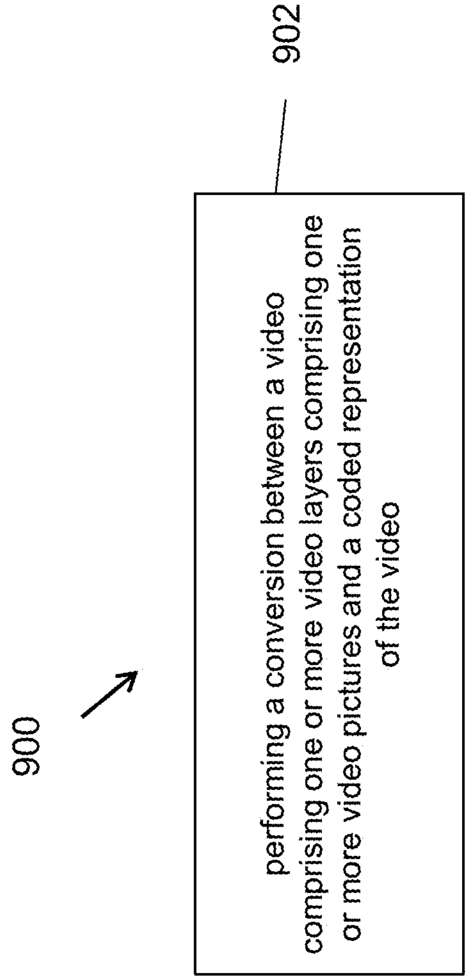
FIG. 3 is a flowchart for an example method of video processing.

1. A method of video processing (e.g., method 600 in FIG. 3), comprising performing (602) a conversion between a video comprising one or more video layers comprising one or more video pictures and a coded representation of the video, wherein the coded representation conforms to a format rule that specifies a relationship between a first syntax element indicating an identifier of a video parameter set and a second syntax element in the coded representation.

2. The method of solution 1, wherein the second syntax element indicates a number of output layer sets in the coded representation.

3. The method of any of solutions 1-2, wherein the second syntax element indicates a total number of output layer sets in the coded representation.

4. The method of any of solutions 1-3, wherein the second syntax element indicates a maximum number of sublayers of the video that refer to a given video parameter set and wherein the format rule specifies that the second syntax element has a value equal to a total number of sublayers of the video that refer to a sequence parameter set.

The following solutions show example embodiments of techniques discussed in the previous section (e.g., items 3-4).

5. A method of video processing, comprising: performing a conversion between a video comprising one or more video layers comprising one or more video pictures and a coded representation of the video, wherein the coded representation conforms to a format rule that permits use of multiple picture parameter sets (PPSs) for in the coded representation and the format rule further permits the PPSs in the coded representation to specify whether picture partitioning is permitted for a referring picture independently of other PPSs.

The following solutions show example embodiments of techniques discussed in the previous section (e.g., item 5).

6. A method of video processing, comprising: performing a conversion between a video comprising one or more video layers comprising one or more video pictures comprising one or more tiles and/or one or more slices and a coded representation of the video, wherein the coded representation conforms to a format rule that specifies that a first syntax element indicative of whether tiles in a slice are in a raster scan order controls a value of a second syntax element.

7. The method of solution 6, wherein the second syntax element includes one or more flags included in a picture parameter set.

8. The method of solution 7, wherein the one or more flags include a flag indicative of presence of an adaptive loop filter, a flag indicative of a reference picture list, a flag indicative of a sample adaptive offset operation or a flag indicative of a quantization parameter difference field.

9. The method of any of solutions 1-8, wherein the conversion comprises parsing and decoding the coded representation to generate the video.

10. The method of any of solutions 1-8, wherein the conversion comprises encoding the video to generate the coded representation.

11. A video decoding apparatus comprising a processor configured to implement a method recited in one or more of solutions 1 to 10.

12. A video encoding apparatus comprising a processor configured to implement a method recited in one or more of solutions 1 to 10.

A second set of solutions show example embodiments of techniques discussed in the previous section (e.g., items 1 and 3-6).

Figure 13A:
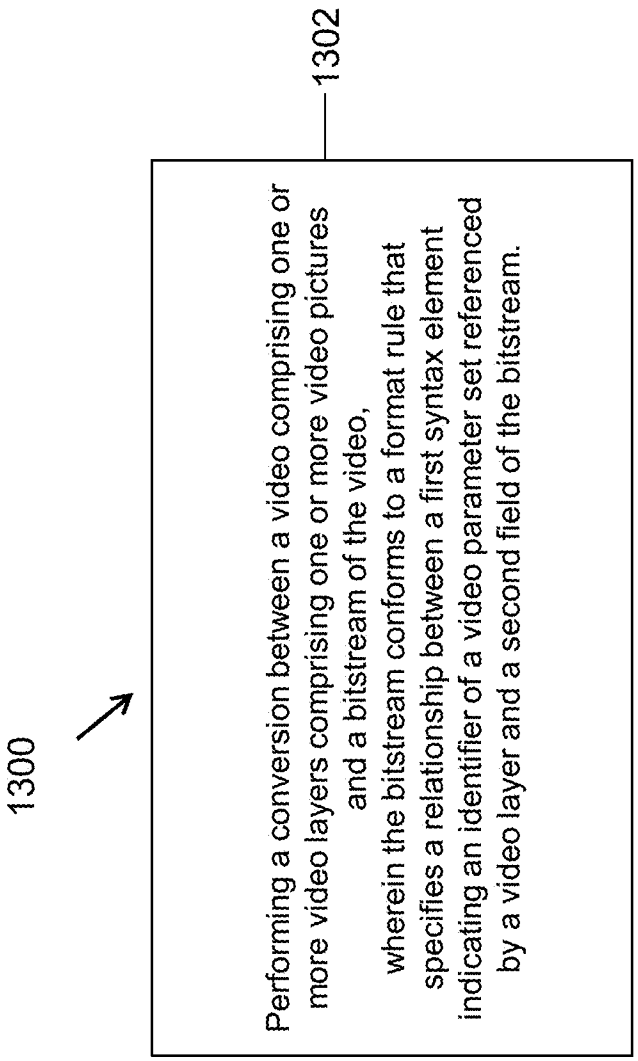
FIGS. 13A to 13E show flowcharts for example methods of video processing based on some implementations of the disclosed technology.

1. A method of video processing (e.g., method 1300 as shown in FIG. 13A), comprising: performing 1302 a conversion between a video comprising one or more video layers comprising one or more video pictures and a bitstream of the video, wherein the bitstream conforms to a format rule that specifies a relationship between a syntax element indicating an identifier of a video parameter set referenced by a video layer and a field of the bitstream.

2. The method of solution 1, wherein the field is a corresponding syntax element or a variable that indicates a total number of output layer sets in the bitstream.

3. The method of solution 1, wherein the field is a variable that indicates a total number of output layer sets specified by the video parameter set.

4. The method of solution 1, wherein the field is a corresponding syntax element or a variable that indicates a number of layers in a first output layer set in the bitstream.

5. The method of any of solutions 1-4, wherein the format rule specifies that, in case that the syntax element has a first value, a value of the field is set equal to a second value different from the first value.

6. The method of solution 5, wherein the first value is 0 and the second value is 1.

7. The method of any of solutions 2-4, wherein the format rule specifies that, in case that a value of the syntax element indicates the identifier is 0, the total number of output layer sets and the number of layers in the first output layer set in the bitstream is equal to 1.

8. The method of solution 1, wherein the field is a syntax element or a variable that indicates a layer identifier of a first layer in a first output layer set and wherein the format rule specifies to set the field to be equal to a network abstraction layer (NAL) unit header identifier (nuh_layer_id) of a layer in a coded video sequence.

9. The method of solution 1, wherein the field indicates a maximum number of sublayers of the video that refer to a given video parameter set and wherein the format rule specifies to set the field to be equal to a total number of sublayers of the video that refer to a sequence parameter set.

Figure 13B:
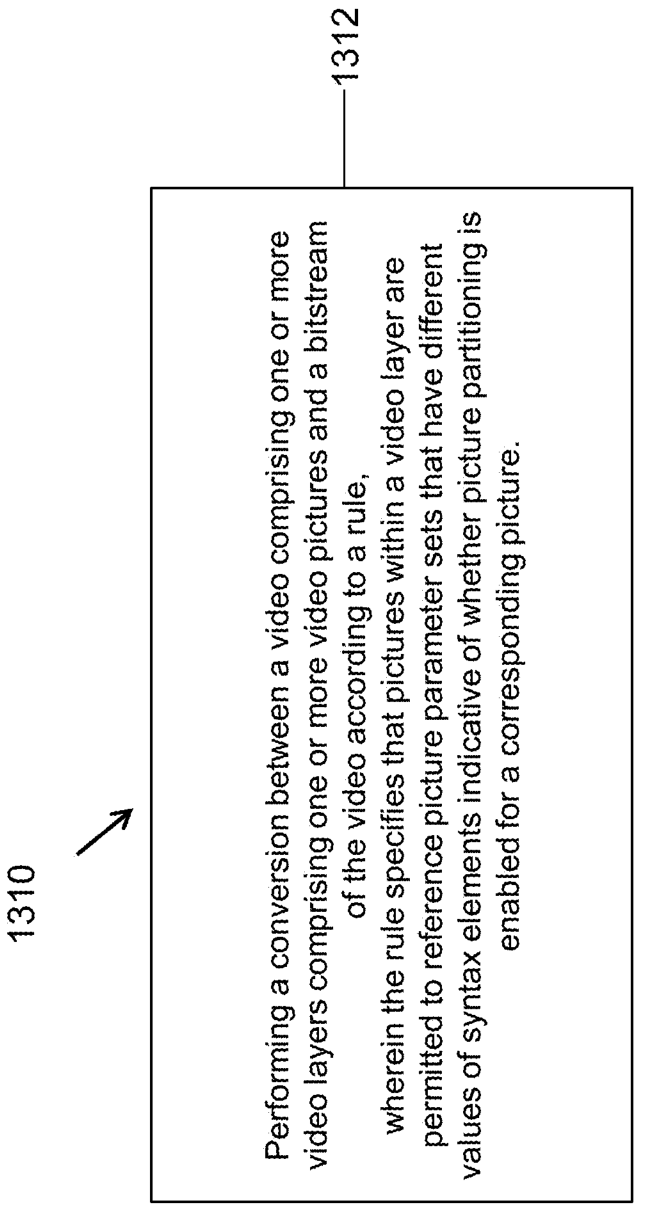

10. A method of video processing (e.g., method 1310 as shown in FIG. 13B), comprising: performing 1312 a conversion between a video comprising one or more video layers comprising one or more video pictures and a bitstream of the video according to a rule, wherein the rule specifies that pictures within a video layer are permitted to reference picture parameter sets that have different values of syntax elements indicative of whether picture partitioning is enabled for a corresponding picture.

11. The method of solution 10, wherein the syntax elements equal to a first value specifies that no picture partitioning is applied to each picture referring to the picture parameter set.

12. The method of solution 10, wherein the syntax elements equal to a second value specifies that each picture referring to a corresponding picture parameter set is allowed to be partitioned into more than one tile or slice.

Figure 13C:
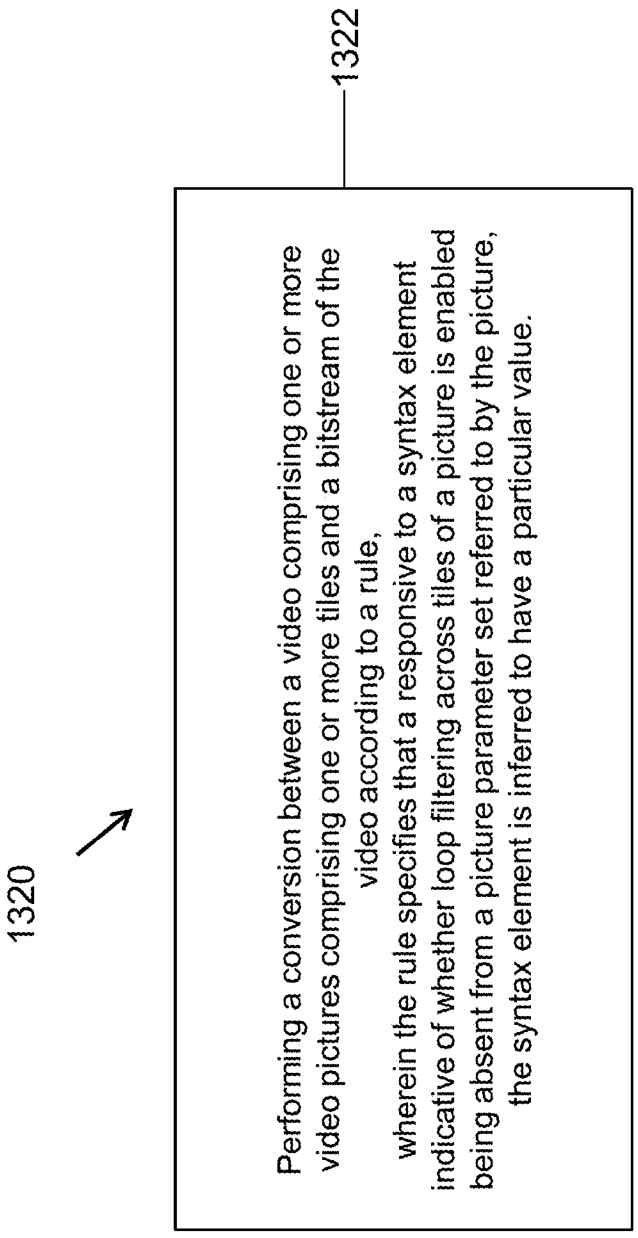

13. A method of video processing (e.g., method 1320 as shown in FIG. 13C), comprising: performing 1322 a conversion between a video comprising one or more video pictures comprising one or more tiles and a bitstream of the video according to a rule, wherein the rule specifies that a responsive to a syntax element indicative of whether loop filtering across tiles of a picture is enabled being absent from a picture parameter set referred to by the picture, the syntax element is inferred to have a particular value.

14. The method of solution 13, wherein the particular value is 0.

15. The method of solution 13 or 14, wherein the syntax element equal to 0 specifies that the in-loop filtering operations across the tiles of the picture are disabled for pictures referring to the picture parameter set.

Figure 13D:
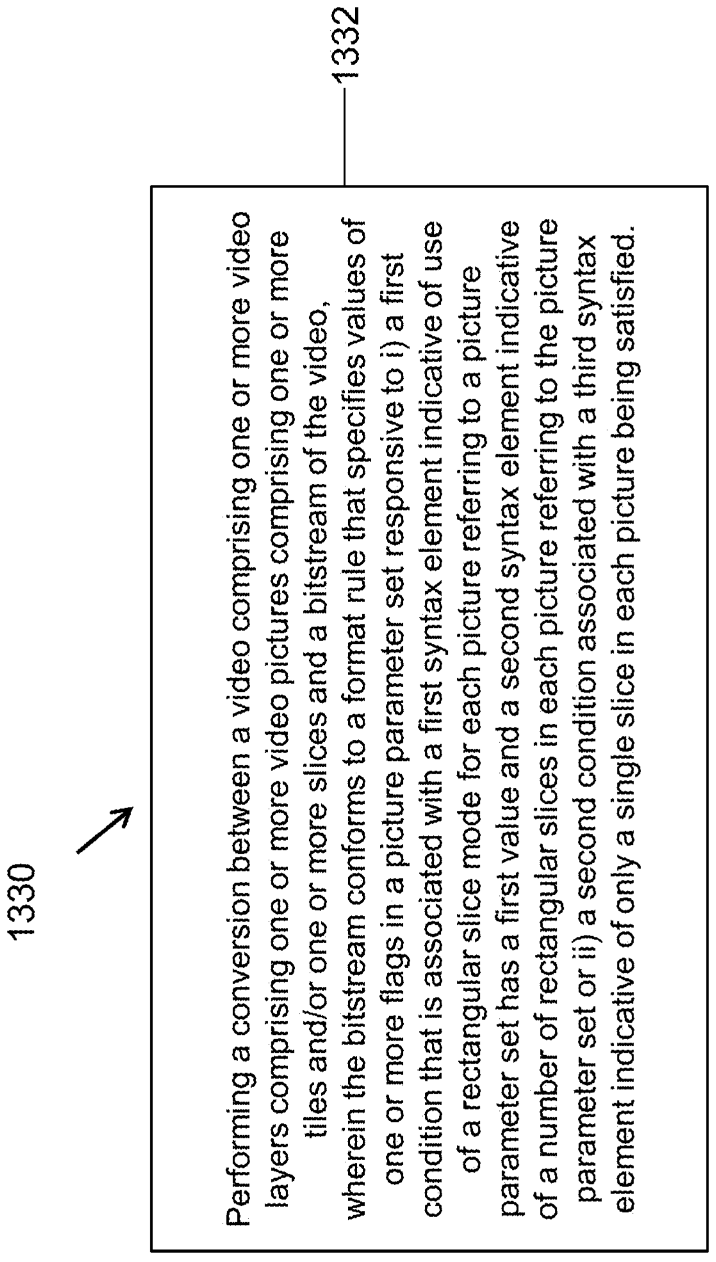

16. A method of video processing (e.g., method 1330 as shown in FIG. 13D), comprising: performing 1332 a conversion between a video comprising one or more video layers comprising one or more video pictures comprising one or more tiles and/or one or more slices and a bitstream of the video, wherein the bitstream conforms to a format rule that specifies values of one or more flags in a picture parameter set responsive to i) a first condition that is associated with a first syntax element indicative of use of a rectangular slice mode for each picture referring to a picture parameter set has a first value and a second syntax element indicative of a number of rectangular slices in each picture referring to the picture parameter set or ii) a second condition associated with a third syntax element indicative of only a single slice in each picture being satisfied.

17. The method of solution 16, wherein the one or more flags include a first flag indicative of a presence of adaptive loop filter information in a picture header syntax structure, a second flag indicative of a presence of reference picture list information in the picture header syntax structure, a third flag indicative of a presence of deblocking filter information in the picture header syntax structure, a fourth flag indicative of a presence of sample adaptive offset filter information in the picture header syntax structure, a fifth flag indicative of a presence of weighted prediction information in the picture header syntax structure, and/or a sixth flag indicative of a presence of quantization parameter delta information difference in the picture header syntax structure.

18. The method of solution 16, wherein the first condition is satisfied in case that the first syntax element equal to 1 and the second syntax element equal to 0.

19. The method of solution 16 or 17, wherein the first syntax element equal to 1 specifies that the rectangular slice mode is in use for each picture referring to the picture parameter set.

20. The method of solution 16 or 17, wherein the second syntax element equal to 0 specifies that no picture partitioning is applied to each picture referring to the picture parameter set.

21. The method of solution 16, wherein the second condition is satisfied in case that the third syntax element is equal to 1.

22. The method of solution 16, wherein the third syntax element equal to 1 specifies that each picture contains a single slice.

23. The method of solution 16, wherein the format rule specifies that the one or more flags are all required to be equal to 0 upon satisfying the first condition or the second condition.

24. The method of solution 16, wherein the format rule specifies that the one or more flags are all skipped and inferred to be equal to 0 upon satisfying the first condition or the second condition.

Figure 13E:
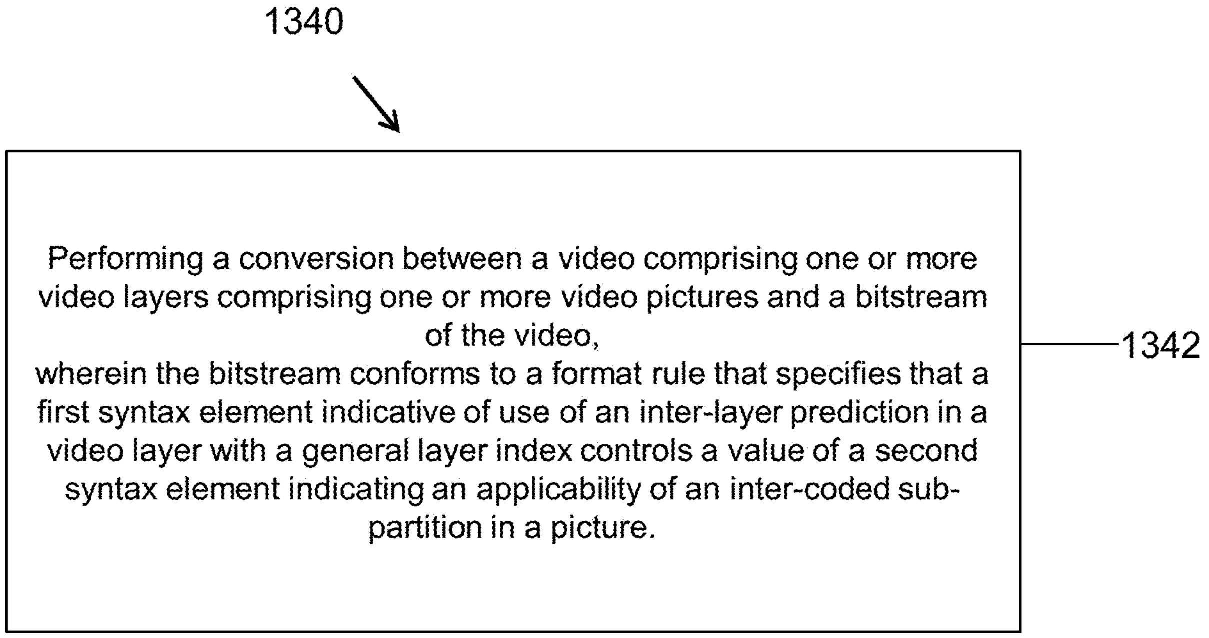

25. A method of video processing (e.g., method 1340 as shown in FIG. 13E), comprising: performing 1342 a conversion between a video comprising one or more video layers comprising one or more video pictures and a bitstream of the video, wherein the bitstream conforms to a format rule that specifies that a first syntax element indicative of use of an inter-layer prediction in a video layer with a general layer index controls a value of a second syntax element indicating an applicability of an inter-coded subpartition in a picture.

26. The method of solution 25, wherein the format rule requires the value of the second syntax element to be equal to 1 in case that the first syntax element is equal to 0.

27. The method of solution 26, wherein the format rule specifies that the value of the second syntax element to be equal to 1 in case that the first syntax element is not present.

28. The method of any of solutions 25-27, wherein the second syntax element equal to 1 specifies a possible presence of one or more coded slices in a picture that have a slice type equal to 0 or 1.

29. The method of any of solutions 25-28, wherein the general layer index of the video layer is equal to a NAL (network abstraction layer) unit header identifier.

30. The method of any of solutions 1 to 29, wherein the conversion includes encoding the video into the bitstream.

31. The method of any of solutions 1 to 29, wherein the conversion includes decoding the video from the bitstream.

32. The method of any of solutions 1 to 29, wherein the conversion includes generating the bitstream from the video, and the method further comprises: storing the bitstream in a non-transitory computer-readable recording medium.

33. A video processing apparatus comprising a processor configured to implement a method recited in any one or more of solutions 1 to 32.

34. A method of storing a bitstream of a video, comprising, a method recited in any one of solutions 1 to 32, and further including storing the bitstream to a non-transitory computer-readable recording medium.

35. A computer readable medium storing program code that, when executed, causes a processor to implement a method recited in any one or more of solutions 1 to 32.

36. A computer readable medium that stores a bitstream generated according to any of the above described methods.

37. A video processing apparatus for storing a bitstream representation, wherein the video processing apparatus is configured to implement a method recited in any one or more of solutions 1 to 32.

A third set of solutions show example embodiments of techniques discussed in the previous section (e.g., item 2).

Figure 14:
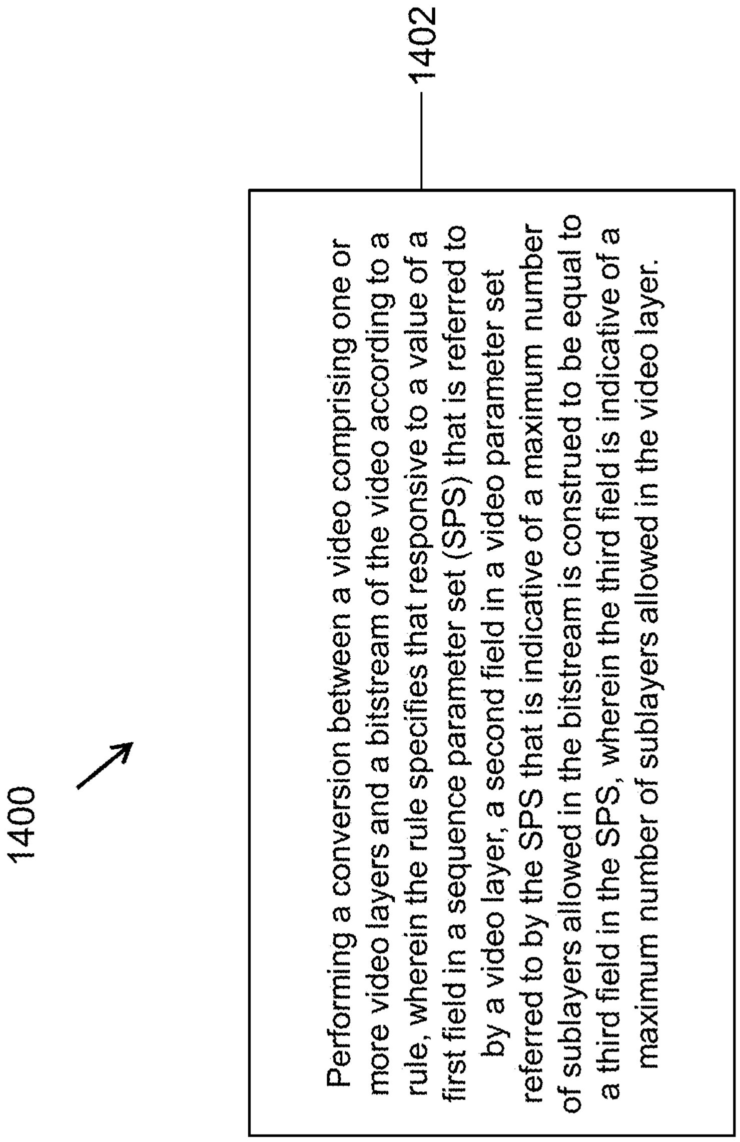
FIG. 14 shows a flowchart for an example method of video processing based on some implementations of the disclosed technology.

1. A method of video processing (e.g., method 1400 as shown in FIG. 14), comprising: performing 1402 a conversion between a video comprising one or more video layers and a bitstream of the video according to a rule, wherein the rule specifies that responsive to a value of a first field in a sequence parameter set (SPS) that is referred to by a video layer, a second field in a video parameter set referred to by the SPS that is indicative of a maximum number of sublayers allowed in the bitstream is construed to be equal to a third field in the SPS, wherein the third field is indicative of a maximum number of sublayers allowed in the video layer.

2. The method of solution 1, wherein the first field is an identifier of the video parameter set.

3. The method of solution 1 or 2, wherein the value of the first field equals to 0.

4. The method of solution 1 or 2, wherein the rule further specifies that responsive to the value of the first field, the value of the third field is in a range of 0 to 6, inclusive.

5. The method of solution 3 or 4, wherein the first field having the value indicates that the sequence parameter set does not refer to any video sequence parameter set.

6. The method of solution 1 or 2, wherein the rule further specifies that responsive to the first field greater than 0, the value of the third field is in a rage of 0 to a value of the second field.

7. The method of solution 1 or 2, wherein the rule specifies that responsive to the value of the first field, a value of the third field is in a range of 0 to 6 but not be greater than a value of the second field.

8. The method of any of solutions 1 to 7, wherein the conversion includes encoding the video into the bitstream.

9. The method of any of solutions 1 to 7, wherein the conversion includes decoding the video from the bitstream.

10. The method of any of solutions 1 to 7, wherein the conversion includes generating the bitstream from the video, and the method further comprises: storing the bitstream in a non-transitory computer-readable recording medium.

11. A video processing apparatus comprising a processor configured to implement a method recited in any one or more of solutions 1 to 10.

12. A method of storing a bitstream of a video, comprising, a method recited in any one of solutions 1 to 10, and further including storing the bitstream to a non-transitory computer-readable recording medium.

13. A computer readable medium storing program code that, when executed, causes a processor to implement a method recited in any one or more of solutions 1 to 10.

14. A computer readable medium that stores a bitstream generated according to any of the above described methods.

15. A video processing apparatus for storing a bitstream representation, wherein the video processing apparatus is configured to implement a method recited in any one or more of solutions 1 to 10.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

The invention claimed is:

1. A method of video processing, comprising:

performing a conversion between a video and a bitstream of the video according to a first rule, wherein the first rule specifies that responsive to a value of a first field of a sequence parameter set (SPS) that is indicative of an identifier of a video parameter set being equal to 0, a second field of the video parameter set that is indicative of a first maximum number of sublayers allowed in a layer specified by the video parameter set is construed to be equal to a third field in the SPS, and wherein the third field is indicative of a second maximum number of sublayers allowed in each coded layer video sequence referring to the SPS, wherein the first rule further specifies that responsive to a syntax element indicative of whether loop filtering across tiles of a picture is enabled being absent from a picture parameter set referred to by the picture, the syntax element is inferred to have a particular value, and the particular value is 0, wherein the conversion is performed according to a second rule, and wherein the second rule specifies that, responsive to the value of the first field being equal to 0, a total number of output layer sets specified by the video parameter set and a number of layers in a first output layer set are equal to 1.

2. The method of claim 1, wherein the first rule further specifies that responsive to the value of the first field being equal to 0, the value of the third field is in a range of 0 to 6, inclusive.

3. The method of claim 1, wherein when the value of the first field is greater than 0, the sequence parameter set refers to the identifier of the video parameter set in a video parameter set level.

4. The method of claim 1, wherein the first rule further specifies that responsive to the value of the first field greater than 0, the value of the third field is in a rage of 0 to a value of the second field, inclusive.

5. The method of claim 1, wherein the value of the second field is equal to the first maximum number minus 1.

6. The method of claim 1, wherein the value of the third field is equal to the second maximum number minus 1.

7. The method of claim 1, wherein the second rule further specifies that, responsive to the value of the first field being equal to 0, a layer identifier of the video parameter is set to be equal to a network abstraction layer (NAL) unit header identifier (nuh_layer_id) of a layer in a coded video sequence.

8. The method of claim 1, wherein the conversion is performed according to a third rule, and wherein the third rule specifies that pictures within a layer are permitted to reference picture parameter sets that have different values of syntax elements indicative of whether picture partitioning is enabled for a corresponding picture.

9. The method of claim 8, wherein the syntax elements equal to a first value specifies that no picture partitioning is applied to each picture referring to a picture parameter set, and the syntax elements equal to a second value specifies that each picture referring to a corresponding picture parameter set is allowed to be partitioned into more than one tile or slice.

10. The method of claim 1, wherein the syntax element equal to 0 specifies that in-loop filtering operations across the tiles of the picture are disabled for pictures referring to the picture parameter set.

11. The method of claim 1, wherein the conversion includes encoding the video into the bitstream.

12. The method of claim 1, wherein the conversion includes decoding the video from the bitstream.

13. An apparatus for processing video data comprising a processor and a non-transitory memory with instructions thereon, wherein the instructions upon execution by the processor, cause the processor to:

perform a conversion between a video and a bitstream of the video according to a first rule, wherein the first rule specifies that responsive to a value of a first field of a sequence parameter set (SPS) that is indicative of an identifier of a video parameter set being equal to 0, a second field of the video parameter set that is indicative of a first maximum number of sublayers allowed in a layer specified by the video parameter set is construed to be equal to a third field in the SPS, and wherein the third field is indicative of a second maximum number of sublayers allowed in each coded layer video sequence referring to the SPS, wherein the first rule further specifies that responsive to a syntax element indicative of whether loop filtering across tiles of a picture is enabled being absent from a picture parameter set referred to by the picture, the syntax element is inferred to have a particular value, and the particular value is 0, wherein the conversion is performed according to a second rule, and wherein the second rule specifies that, responsive to the value of the first field being equal to 0, a total number of output layer sets specified by the video parameter set and a number of layers in a first output layer set are equal to 1.

14. The apparatus of claim 13, wherein the conversion is performed according to a third rule, wherein the third rule specifies that pictures within a layer are permitted to reference picture parameter sets that have different values of syntax elements indicative of whether picture partitioning is enabled for a corresponding picture.

15. The apparatus of claim 13, wherein the first rule further specifies that responsive to the value of the first field being equal to 0, the value of the third field is in a range of 0 to 6, inclusive.

16. The apparatus of claim 13, wherein when the value of the first field is greater than 0, the sequence parameter set refers to the identifier of the video parameter set in a video parameter set level.

17. A non-transitory computer-readable storage medium storing instructions that cause a processor to:

perform a conversion between a video and a bitstream of the video according to a first rule, wherein the first rule specifies that responsive to a value of a first field of a sequence parameter set (SPS) that is indicative of an identifier of a video parameter set being equal to 0, a second field of the video parameter set that is indicative of a first maximum number of sublayers allowed in a layer specified by the video parameter set is construed to be equal to a third field in the SPS, wherein the third field is indicative of a second maximum number of sublayers allowed in each coded layer video sequence referring to the SPS, wherein the first rule further specifies that responsive to a syntax element indicative of whether loop filtering across tiles of a picture is enabled being absent from a picture parameter set referred to by the picture, the syntax element is inferred to have a particular value, and the particular value is 0, wherein the conversion is performed according to a second rule, and wherein the second rule specifies that, responsive to the value of the first field being equal to 0, a total number of output layer sets specified by the video parameter set and a number of layers in a first output layer set are equal to 1.

18. The non-transitory computer-readable storage medium of claim 17, wherein the conversion is performed according to a third rule, wherein the third rule specifies that pictures within a layer are permitted to reference picture parameter sets that have different values of syntax elements indicative of whether picture partitioning is enabled for a corresponding picture.

19. A method for storing a bitstream of a video, comprising:

generating the bitstream of the video according to a first rule, and storing the bitstream in a non-transitory computer-readable recording medium;

wherein the first rule specifies that responsive to a value of a first field of a sequence parameter set (SPS) that is indicative of an identifier of a video parameter set being equal to 0, a second field of the video parameter set that is indicative of a first maximum number of sublayers allowed in a layer specified by the video parameter set is construed to be equal to a third field in the SPS, wherein the third field is indicative of a second maximum number of sublayers allowed in each coded layer video sequence referring to the SPS, wherein the first rule further specifies that responsive to a syntax element indicative of whether loop filtering across tiles of a picture is enabled being absent from a picture parameter set referred to by the picture, the syntax element is inferred to have a particular value, and the particular value is 0, wherein the bitstream is generated according to a second rule, and wherein the second rule specifies that, responsive to the value of the first field being equal to 0, a total number of output layer sets specified by the video parameter set and a number of layers in a first output layer set are equal to 1.

* * * * *